INVENTOR.
ROBERT A. PALMORE

BY Arthur H Robert

ATTORNEY

March 27, 1956 — R. A. PALMORE — 2,739,667

FILTER FRAME

Filed Aug. 2, 1954 — 3 Sheets-Sheet 2

INVENTOR.
ROBERT A. PALMORE

BY *Arthur J. Robert*

ATTORNEY

March 27, 1956  R. A. PALMORE  2,739,667
FILTER FRAME

Filed Aug. 2, 1954  3 Sheets-Sheet 3

INVENTOR.
ROBERT A. PALMORE
BY
Arthur H Robert
ATTORNEY 2,739,667
Patented Mar. 27, 1956

2,739,667
FILTER FRAME

Robert A. Palmore, Louisville, Ky., assignor to American Air Filter Company, Inc., Louisville, Ky., a corporation of Delaware Application August 2, 1954, Serial No. 447,194

7 Claims. (Cl. 183—71)

This invention relates to a filter frame, and is an improvement on the type of frame shown and claimed in Patent No. 2,211,382 issued August 13, 1940, to Arthur Nutting.

In said Nutting patent the filter comprises two frame members designated as the M frame and the W frame which have serrate interlocking end walls that receive and clamp the corrugated filter medium between the end walls. The present invention relates to an improved construction of said end walls and frames.

It is an object of the present invention to provide a filter frame having removable end fingers which may be easily assembled or replaced as required.

Another object is the provision of a simplified filter frame structure which is inexpensive and easy to manufacture.

Another object is the provision of a filter frame which can be easily and inexpensively made in a variety of lengths.

The invention will be described in greater detail in the following specification taken in connection with the accompanying drawing illustrating a preferred embodiment of the invention by way of example, and wherein.

Figure 1:
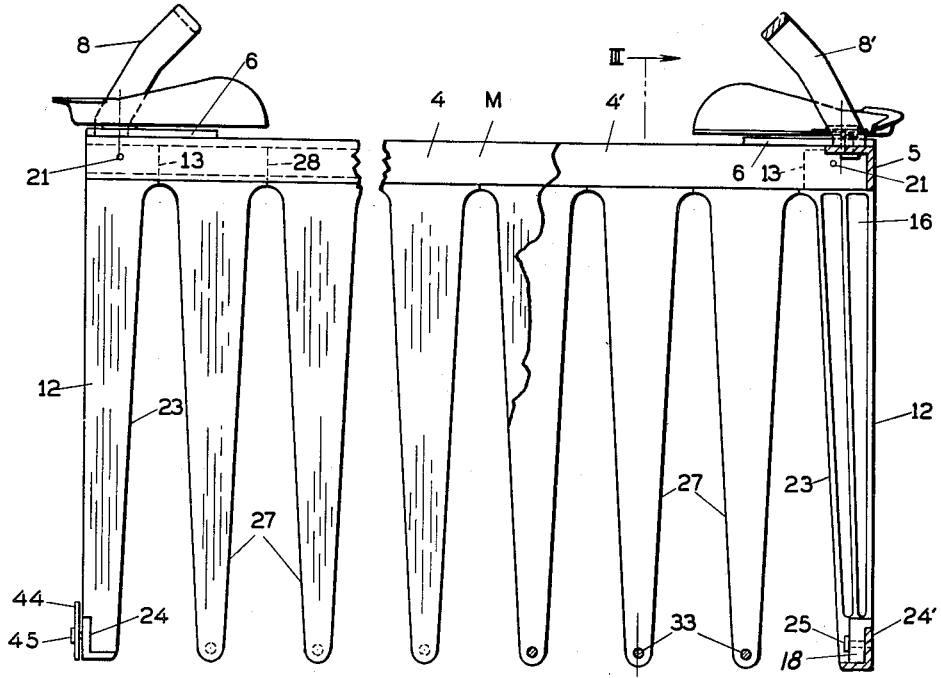
Figure 1 is an end elevation of the M frame shown in Figure 3 as viewed from the right with parts broken away along the centerline.
Figure 3:
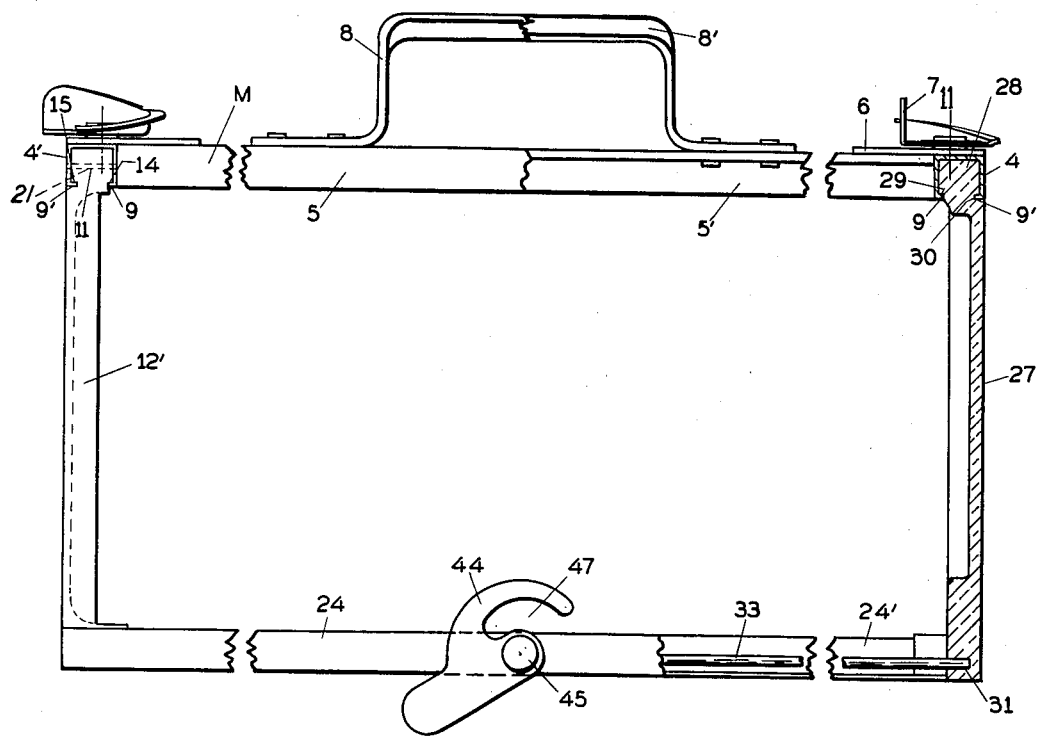
Figure 3 is a side elevation of Figure 1 as viewed from the left with parts broken away along the line III—III.
Figure 11:
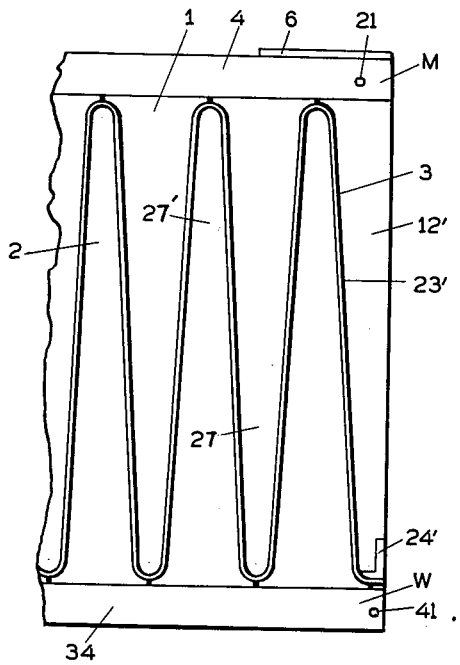
Figures 11 and 12 are end and side views respectively of an assembled filter unit.
Figure 12:
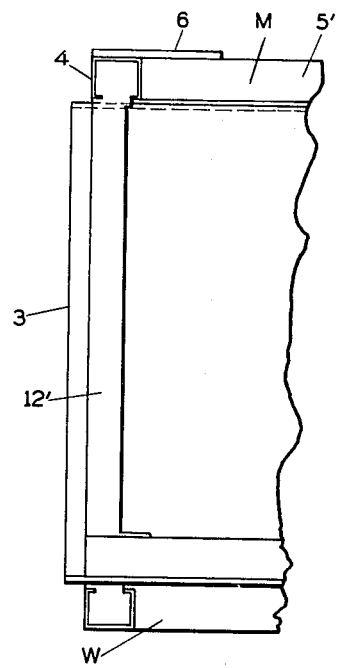

Referring to the drawing, Figures 11 and 12, the filter unit comprises two frames M and W, having serrate interlocking end walls 1, 2 respectively, with a corrugated sheet 3 of a filter medium received between the interlocking end walls. As shown in Figures 1 and 3, the M frame comprises end channel members 4, 4' having angle bars 5, 5' secured thereto, as by welding, in abutting relation. The corners thus formed are reinforced by gusset plates 6 which carry pivoted latches 7. Handles 8, 8' are riveted to the angle bars 5, 5' respectively near the middle. As the channel bars 4, 4' are identical in construction only channel member 4 will be described in detail.

Figures 5, 6, 7, 8, 9, 10:
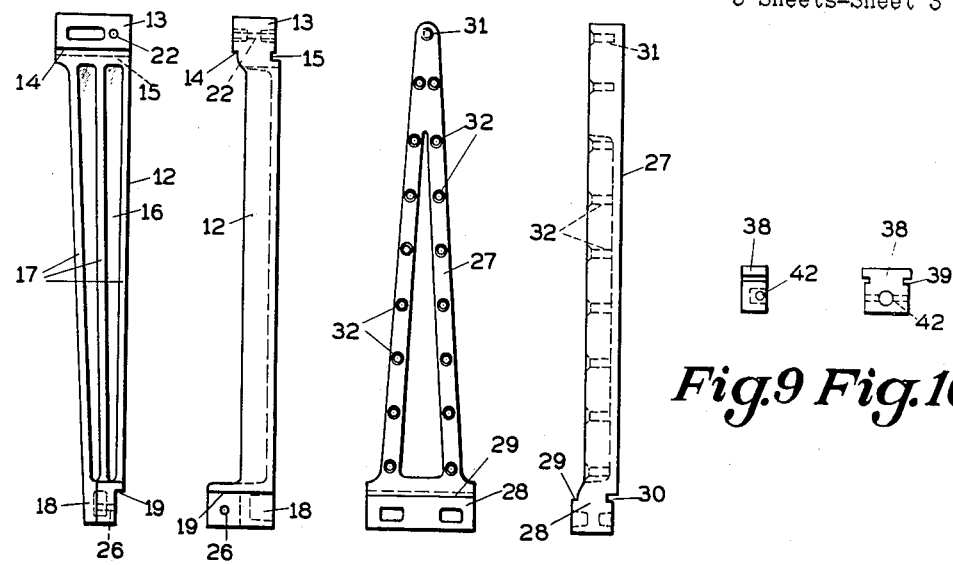
Figures 5 and 6 are front and side views of a corner post.
Figures 7 and 8 are front and side views of an intermediate finger.
Figures 9 and 10 are front and side views of an end block.

As shown in Figure 3, the channel bar 4 is provided with inturned flanges 9, 9' the channel or hollow portion being indicated at 11. At the corners of the M frame are pairs of corner posts 12, 12' (Figs. 1 and 3), these end posts being identical except that one post 12' is the obverse of the post 12. As shown in Figs. 5 and 6 the post 12 has a base portion or head 13 with a shoulder 14 on one side and a groove or keyway 15 on the other side. The head may be recessed to conserve material. Extending from the head is an outside wall 16 provided on one face with reinforcing ribs 17. The wall and ribs merge with the head 13 and with a foot 18 having a step or recess 19 on one face. The corner post 12 is assembled to the channel member 4' (Fig. 3) at one end by stringing the head 13 into the channel 11 with one flange 9' being received in keyway 15, and the other flange 9 engaging the shoulder 14, and the corner post is locked in position by a pin 21 passing through the walls of the channel member and hole 22 in head 13. Corner post 12 is similarly assembled to the other end of the channel member 4'. It will be noted posts 12, 12' are arranged in each channel member with the inclined or tapered edges 23, in opposed face to face relation. The pairs of posts 12, 12' at each side are joined at their bottoms by angle bars 24, 24' received in the recesses 19 and secured in place by pins 25 passing through the holes 26 in the feet 18.

The end walls 1 of frame M are made up of the corner posts 12, 12' and a plurality of intermediate fingers 27, which interlock with the similar fingers 27' constituting the end walls 2 of frame W. As shown in Figure 7, each finger 27 comprises a head 28 with a shoulder 29 on one side and a groove or keyway 30 on the other side. The finger 27 is tapered and is thickened at the tapered edges. At the apex is a socket 31 and similar sockets 32 are provided along the tapered edges. When the fingers 27 are employed in the M frame the apex sockets 31 receive rods 33, and the sockets 32 are not utilized, so for this reason they are not illustrated in Figures 1 and 3. As shown in Figure 3, the head 28 of the finger is received in channel 11 with flange 9' received in groove 30 and flange 9 engaging shoulder 29. In assembly the fingers 27 are inserted into the channels before the corner posts are inserted and secured.

Figure 2:
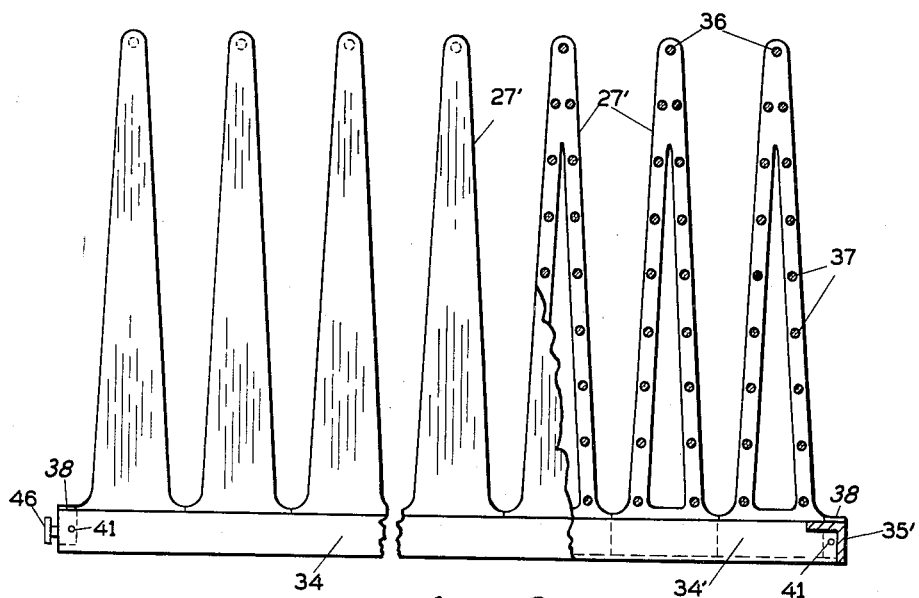
Figure 2 is an end elevation of the W frame as shown in Figure 4 as viewed from the right with parts broken away.
Figure 4:
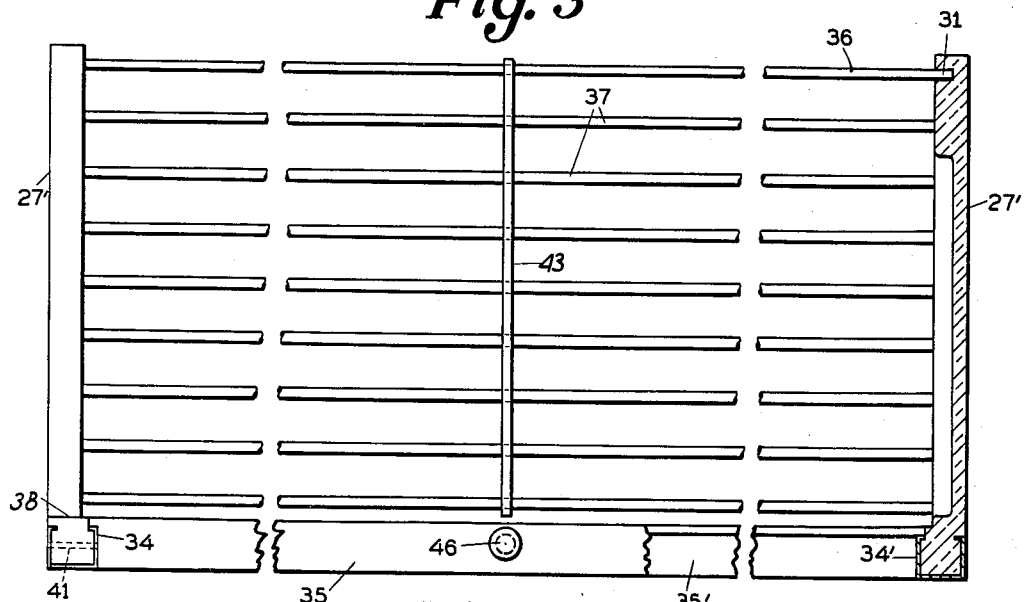
Figure 4 is a side elevation partly in section of the W frame.

As shown in Figures 2 and 4, the W frame is made up of channels 34, 34' joined by angle bars 35, 35', the channel bars 34, 34' being similar to channel members 4, 4'. Each end wall 2 of frame W is made up of fingers 27' similar to fingers 27, which are received similarly in channels 34, 34'. Each finger 27' has an apex socket 31 which receives an end of rod 36, and the sockets 32 each receive an end of rods 37. After the fingers are assembled in the channels they are locked in place by the end blocks 38 which are grooved at 39 (Figs. 9 and 10) to receive the flanges of the channel member. Each block is locked in position by a pin 41 which passes through the channel walls and through a bore 42 in the block. If desired, a series of triangular center braces 43 may be provided connecting the rods 36 and 37 near the middle.

The angle bars 24, 24' each carry a latch member 44 pivoted on a pin 45. When the M and W frames are assembled the latches 44 are turned to receive pins 46 on the angle bars 35, 35' of the W frame in the slots 47 of the latches, to hold the frames assembled.

The fingers 27, 27', corner posts 12, 12' and end blocks 38 preferably are formed by casting a suitable synthetic plastic material but they may be made of other materials if desired. The arrangement illustrated provides an inexpensive way to make filter frames of various sizes because the channel members 4, 4' and 34, 34' may be made of extruded metal cut to the desired length and the requisite number of fingers can be inserted to produce the desired width of frame. Also, in the event of breakage of one or more fingers they may be replaced inexpensively by releasing the corner post or end block (depending on whether the finger is in the M frame or W frame) removing the broken finger, and replacing it with a new finger.

I claim as my invention:

1. A filter frame member comprising: open end channel members providing upwardly open longitudinal channels; a plurality of separate fingers in said channels; cooperating means extending lengthwise of the channels and interlocking said respective fingers and channels and permitting sliding movement of the fingers longitudinally of said channels for removal of said fingers at the ends of said channels; blocking members removably interlocked in said channels adjacent the ends thereof; and removable means for locking said blocking members in said channels.

2. A filter comprising: a pair of frames having serrate mutually interlocking end walls for carrying a corrugated filter medium therebetween, the interlocking end walls of at least one frame comprising a channel member opening toward said other frame; a plurality of separate fingers removably carried in said channel member; and means for interlocking said fingers in said channel member.

3. A frame for a filter as specified in claim 1 wherein: said blocking members comprise corner posts, each having one end positioned in said channels; and wherein side bars connect the other ends of pairs of corner posts.

4. A filter as specified in claim 2 wherein: said means for interlocking said fingers in said channel member comprises inturned flanges on said channel adjacent the running edges, and said fingers have keyways for receiving said flanges.

5. A filter member comprising: a pair of frames having serrate mutually interlocking end walls adapted to receive a corrugated filter medium therebetween, each of said frames comprising end channel members opening toward the other of said frames; and said end walls comprising a plurality of separate fingers removably carried in said channel members, the fingers of one frame alternating with and interlocking with the fingers of the other frame; and means for locking said fingers in said channel members.

6. A filter member as specified in claim 5 having: corner posts received in said channels of one of said frames at the corners thereof; and a bar connecting the ends of a pair of corner posts.

7. A filter member as specified in claim 5 wherein: said channel members have inturned flanges; and said fingers provide shoulders for receiving said flanges.

References Cited in the file of this patent

UNITED STATES PATENTS

| | | |
|---|---|---|
| 2,074,294 | Woodruff | Mar. 16, 1937 |
| 2,080,154 | Strindberg | May 11, 1937 |
| 2,211,382 | Nutting | Aug. 13, 1940 |
| 2,681,155 | Graham | June 15, 1954 |

FOREIGN PATENTS

| | | |
|---|---|---|
| 640,873 | Great Britain | Aug. 2, 1950 |